United States Patent [19]
Fornoff et al.

[11] 3,948,624
[45] Apr. 6, 1976

[54] REMOVAL OF SULFUR COMPOUNDS FROM GAS STREAMS

[75] Inventors: Louis Leonard Fornoff, Cedar Grove, N.J.; William George Matthews, Flushing, N.Y.

[73] Assignee: Union Carbide Corporation, New York, N.Y.

[22] Filed: Feb. 4, 1974

[21] Appl. No.: 439,531

[52] U.S. Cl. ................................. 55/73; 55/75
[51] Int. Cl.² ................................. B01D 53/00
[58] Field of Search .............. 55/73, 75, 51, 48

[56] References Cited
UNITED STATES PATENTS

| | | | |
|---|---|---|---|
| 3,100,146 | 8/1963 | Huntington | 55/9 |
| 3,577,706 | 5/1971 | Moller | 55/73 X |

OTHER PUBLICATIONS

J. A. Brink, Jr. et al., *Mist Eliminators for Sulfuric Acid Plants,* Chemical Engineering Progress, Vol. 64, No. 11 (pp. 82–86), Nov. 1968.

*Molecular Sieves — Processing Tool of the Future?,* "The Refining Engineer, (P.C.-53), Feb. 1957.

*Primary Examiner*—Thomas G. Wyse
*Assistant Examiner*—Ethel R. Cross
*Attorney, Agent, or Firm*—Richard G. Miller

[57] ABSTRACT

The sulfur trioxide, sulfuric acid vapor and sulfuric acid mist content of the effluent gas stream from a contact process sulfuric acid absorber are substantially decreased by pre-treating the gas stream prior to its passage through a conventional mist eliminator. The treatment steps include cooling the absorber effluent to below 100°F and contacting same with aqueous sulfuric acid in a particular concentration range and thereafter maintaining the gas phase in the mist eliminator saturated with respect to $H_2SO_4$ vapor.

5 Claims, 1 Drawing Figure

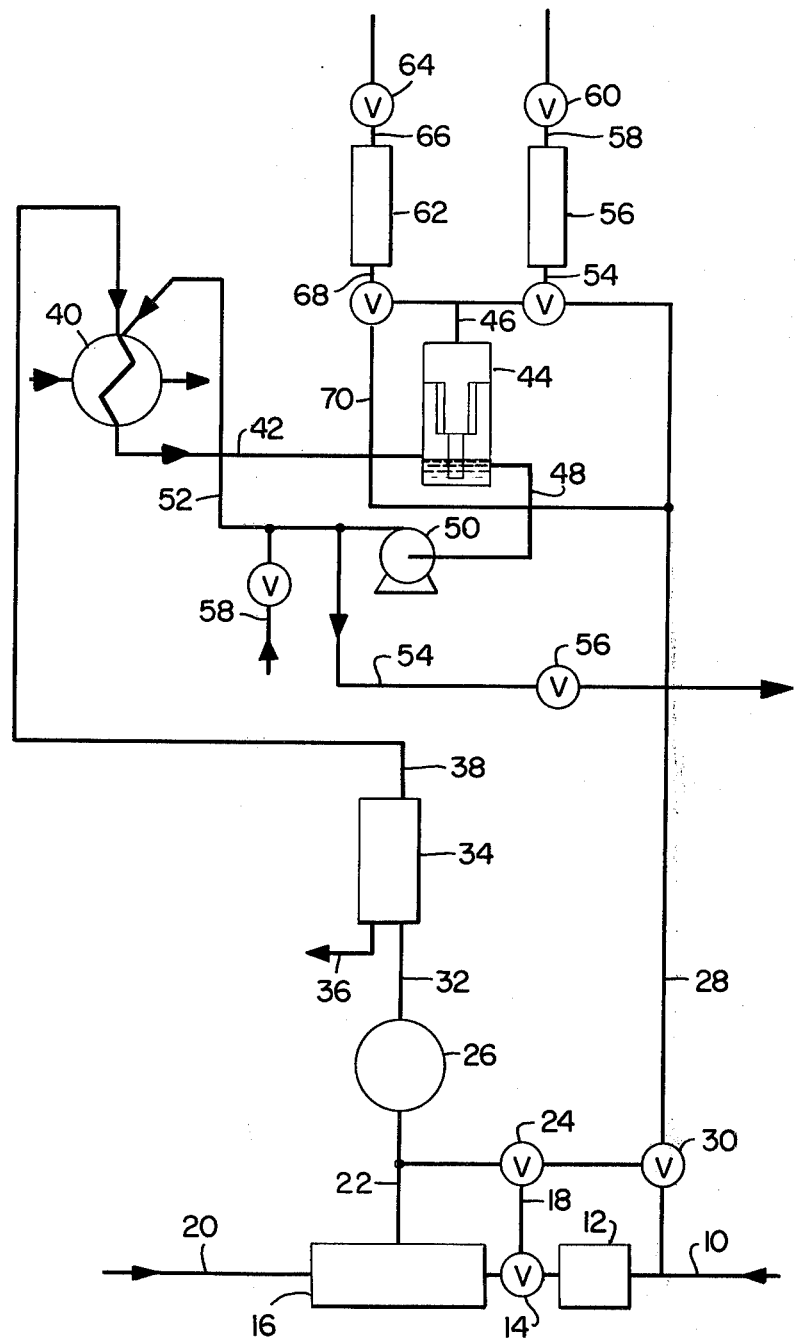

REMOVAL OF SULFUR COMPOUNDS FROM GAS STREAMS

The present process relates in general to a method for removing sulfuric acid mist from gas streams, and more particularly to a method for removing sulfuric acid mist, sulfuric acid vapor, monomeric and polymeric sulfur trioxide and nitrogen oxides from the effluent gas streams from absorber towers in a contact process for preparing sulfuric acid.

In the contact process for the production of sulfuric acid, a gas stream containing sulfur dioxide and free oxygen is converted by contact with a catalyst according to the strongly exothermic reaction $$2 SO_2 + O_2 \rightleftharpoons 2 SO_3$$

Generically, sulfuric acid plants in which sulfur dioxide and oxygen are converted to sulfur trioxide in contact with a solid catalyst are considered to be contact process plants whether or not the sulfur dioxide production is integrated with the particular plant. The converter in the contact process has always used either a platinum or vanadium catalyst since they are the only known materials providing commercially feasible conversion rates. At present the most commonly used are the vanadium-based materials which are complex compositions containing vanadium in the oxidation state corresponding to vanadium pentoxide ($V_2O_5$). Depending upon the particular catalyst mass employed and the composition of the $SO_2$-containing feed stream, the converter can comprise one or a plurality of stages operated at various temperature conditions to achieve optimum $SO_3$ production. In the converter the reaction:

$$2 SO_2 + O_2 \rightleftharpoons SO_3$$

can be made to go almost, but not completely, to the sulfur trioxide product side at temperatures of below 700°F. at very slow reaction rates. Higher temperatures increase the reaction rates, but the reaction equilibrium is shifted toward increasing concentrations of sulfur dioxide. In the commercial practice of the contact process the economic balance between increasing the reaction rate and decreasing the equilibrium toward the sulfur trioxide product side of the reaction is the controlling factor, with the result that the effluent gas from the catalytic conversion stage has an appreciable content of sulfur dioxide. Depending largely upon the temperature at which the sulfur burner is operated some nitrogen oxides, $NO_x$, can be formed in addition to sulfur trioxide when air is the source of the free oxygen used to form the sulfur dioxide.

From the converter the mixture of gases is passed to an adsorber (scrubber) unit wherein intimate contact is provided with concentrated sulfuric acid (usually about 98 weight-% $H_2SO_4$, the remainder being essentially water). Most of the $SO_3$ in the gas stream is converted to sulfuric acid, but a small percentage of the $SO_3$ molecules entering the absorber escape as such or emerge in the effluent gas stream in a hydrated form other than $H_2SO_4$. Essentially all of the $SO_2$, $NO_x$, $O_2$ and $N_2$ entering the absorber passes through and is contained in the effluent gas stream which also contains some sulfuric acid and water in the vapor phase. Moreover, both the composition of the absorber effluent stream and the fact that it leaves the absorber at a temperature of from 120°F to 200°F., most commonly 150°F. to 170°F., favor the formation of sulfuric acid mist which is invariably present and constitutes a troublesome problem. These mist droplets of liquid sulfuric acid are, by generally accepted definition, less than 10 microns in diameter and are to be distinguished from spray droplets which are 10 microns or more in diameter up to about 10,000 microns. Whereas sprays are rather easily removed from suspension in gas streams, true mists are extremely difficult to remove. Mists are difficult if not impossible to produce mechanically, but are easily formed by reaction of vapor phase components such as $SO_3$ and $H_2O$ to form sulfuric acid which thereafter condenses. Also in the presence of appropriate nucleating particles, the physical condensation of vapor phase substances such as sulfuric acid vapor can produce mist particles. It is for these reasons that the composition and high temperature of contact process absorber effluents both favor mist formation.

With the recent imposition of rigorous limits on the levels of $SO_2$ concentrations of gases vented to the atmosphere, an effective means of pollution abatement for contact process sulfuric acid plants is the treatment of absorber effluent streams to selectively adsorb or chemisorb most of the $SO_2$ present. One such process employs one or more fixed adsorbent beds containing zeolitic molecular sieves and is described in detail in copending application Ser. No. 262,561, filed June 14, 1972 now U.S. Pat. No. 3,829,560. Other treating processes utilize ion exchange resins, i.e., polymers containing basic groups along their polymer chain which react reversibly with $SO_2$ and under mild temperature conditions of about 220°F are regenerated by the desorption of $SO_2$. Fluidized beds utilizing activated carbon as the adsorbent have also been proposed to remove $SO_2$ from the stack gases of sulfuric acid plants.

Although none of these adsorbent systems is adversely affected by contact with $SO_2$, contact with $SO_3$, $NO_2$ and sulfuric acid vapor in the presence of water vapor can cause severe degradation of the structure and/or adsorptive properties of the adsorbents. In practice a limited amount of sorbent destruction is anticipated and tolerated, and a portion of the bed is designed for sacrifice to this factor. Because, however, the thus deactivated portion of the bed must be heated and cooled to the same extent as the active part of the bed during adsorption-desorption cycling, it is economically advantageous to maintain as large a percentage as possible of the bed in an active adsorption-capable state.

It is accordingly the general object of the present invention to provide a method for removing sulfuric acid vapor and mist from the absorber effluent of contact process sulfuric acid plants. Other and more particular objects will be apparent from the specification and appended claims.

In accordance with the present invention there is provided a process which comprises providing a gas stream effluent from a contact process sulfuric acid absorber, said gas stream effluent being at a temperature of from 120°F. to 200°F. as a result of passage through said absorber, and comprising $SO_2$, oxygen, $SO_3$, sulfuric acid vapor and sulfuric acid mist, cooling said gas stream effluent to a temperature of from 50°F. to 100°F. and intimately contacting same with an aqueous sulfuric acid solution containing from 93 to 99 weight-% $H_2SO_4$ whereby said gas stream becomes saturated with respect to $H_2SO_4$ vapor at the existing temperature and contains sulfuric acid mist particles, thereafter passing said gas stream to a mist eliminator, preferably a fiber mist eliminator, to remove said mist particles while maintaining the gas stream saturated with respect to sulfuric acid vapor, withdrawing the demisted gas stream from the mist eliminator and further treating said gas stream to remove $SO_2$ therefrom, preferably by selective adsorption in a fixed bed of crystalline zeolitic molecular sieves.

The sulfuric acid mist-laden gas streams treated in accordance with the present process are those emerging from the final sulfuric acid adsorber tower in contact process sulfuric acid plants, and as indicated hereinbefore, are not of fixed composition. All however contain sulfuric acid mist, sulfuric acid vapor, $SO_3$, $SO_2$ and oxygen. An illustrative gas stream composition from a sludge acid plant is as follows:

| | |
|---|---|
| $SO_2$ Content | 1,500 to 4,000 ppm |
| Acid Mist | 2 to 20 mg./SCF |
| $SO_3$ Content | 0.3 to 1.3 ppm |
| Oxygen | 9 to 11% (vol.) |
| Water | Trace |
| Inert Gas ($N_2$, A, $CO_2$) | Remainder |
| Temperature | 150°F. to 180°F. |

The means employed to cool the gas stream from above 120°F. to within the range of 50°F. to 100°F is not a critical feature of the present process. It has been found that a conventional vertical shell and tube type heat exchanger in which a spray of sulfuric acid (93 to 99 weight-% $H_2SO_4$) is used to wet the tube surfaces contacting the gas stream being cooled is an inexpensive and very efficient means for accomplishing the cooling. The technique requires only relatively small quantities of recycled sulfuric acid so that the maintenance of proper temperature and acid concentration is easily done. Many other means will readily suggest themselves to those skilled in the art, as for instance sparging the gas stream to be cooled into the sulfuric acid cooling medium. Whereas such a procedure will produce an increase in spray droplets entrained in the gas stream, this is not a disadvantageous occurrence. Moreover, since it is essentially impossible to produce true mist from this system by mechanical means, the mist problem is not increased.

Although we do not wish to be bound by any particular theory, it appears that cooling the gas stream and contacting same with concentrated sulfuric acid liquid provides several significant features to the overall process. Firstly, a substantial quantity of $H_2SO_4$ vapor is condensed to the liquid form and can thus be retained within the system rather than passing out of the system into any $SO_2$ receovery means being employed. This is especially beneficial where adsorbent beds, and particularly molecular sieve adsorbent beds, are employed to collect $SO_2$ for recycle to the sulfuric acid producing process. Secondly, water vapor present in the gas stream being treated at a very low partial pressure is increased in concentration in the cooled gas stream and facilitates reaction of free $SO_3$ and any $NO_x$ which may be present to form sulfuric acid and nitric acid respectively. Thirdly, the presence of $H_2SO_4$ in a concentration range of 93 to 99 weight-% facilitates solution of $SO_3$ and any $NO_x$ vapors which may be present to form sulfuric acid and nitric acid respectively.

The mist eliminator to which the cooled gas stream is fed for final removal of mist particles is not critical in design since the pre-treatment accorded the gas stream entering it enables the apparatus to perform more efficiently than otherwise would be the case. A variety of types of mist eliminators are commercially available. Generally they are classified generically according to the collection mechanism utilized. Electrostatic precipitators are efficient in removing true mists but tend to be somewhat expensive to maintain in the corrosive environment of a sulfuric acid plant. Fiber or mesh type mist eliminators are more commonly employed in this application and operate by the mechanism of inertial impaction, direct interception or Brownian movement or a combination thereof. Where extremely high efficiency is not required a fiber type mist eliminator can be used which employs inertial impaction as the principal collection mechanism, in which the momentum of larger particles usually greater than 3 microns prevents them from following gas streamlines through a fiber bed. By the mechanism termed direct interception, particles can follow a gas streamline and be collected without inertial impaction if the streamline is close to a fiber, i.e. the diameter of the mist particle is greater than distance of the stream line from the fiber. Brownian movement is the collection mechanism employed where maximum efficiency is desired. Relatively low gas stream velocities are used in order that the random movement of the smaller particles have maximum opportunity to impact on a fiber.

Although it is necessary in the practice of the present process to pass only the gas phase with its entrained mist to the mist eliminator, provided the gas remains saturated with $H_2SO_4$ vapor and at a temperature of from 50° to 100°F., in a preferred embodiment, a portion of the liquid phase not in the form of mist to the mist eliminator along with the gas stream. By maintaining a liquid phase in the mist eliminator which has a composition closely approaching that which would be in equilibrium with the gas phase, maintaining a saturation condition of $H_2SO_4$ vapor in the gas phase is facilitated, and in the course of recycling the liquid phase between the cooling apparatus and the mist eliminator one can advantageously control the temperature and concentration of the liquid phase with respect to $H_2SO_4$ and also lower the concentration of nitric acid which tends to accumulate if $NO_x$ exists in the absorber effluent gas stream being treated. Periodic or continuous bleeding off of some of the recycled liquid phase accompanied by the addition of make-up sulfuric acid of proper concentration and/or the addition of water is an easy method for such control.

The gas phase effluent from the mist eliminator is thereafter treated in any desired manner to avoid the venting of undue amounts of $SO_2$ to the atmosphere. A preferred embodiment is the use of a fixed bed of a crystalline zeolitic molecular sieve adsorbent having a pore diameter of at least 4 Angstroms. The molecular sieve adsorbent bed effectively adsorbs water and sulfur dioxide and is capable of reducing the $SO_2$ concentration in the effluent or vent gas from the mist eliminator to about 50 ppm or less. The absorption bed is periodically desorbed of $SO_2$ and $H_2O$ using a dry, hot, preferably oxygen-containing non-sorbable purge gas and the $SO_2$-containing effluent, preferably dehydrated, is recycled to a converter for conversion to $SO_3$ and subsequent production of additional sulfuric acid.

The aforesaid purge gas can comprise oxygen, nitrogen and any of the inert gases i.e., helium, neon, argon and the like and carbon dioxide. Water as an impurity, can be present in an amount of not greater than 100 ppm in the purge gas. Other impurities such as carbon monoxide, hydrogen and hydrocarbons are preferably kept to minimum practical concentration levels since they consume oxygen in the converter and tend to inhibit conversion of $SO_2$ to $SO_3$ therein. The oxygen content of the preferred purge gas composition can range from a lower limit of that of the effluent from the molecular sieve absorber during the adsorption stoke up to essentially pure oxygen. Advantageously the oxygen content of the purge gas is such that the $SO_2$-containing effluent from the adsorption bed during $SO_2$ desorption contains the proper proportion of oxygen and $SO_2$ for optimum conversion of $SO_2$ to $SO_3$ in the catalytic converter.

The present process and particularly the preferred embodiment thereof is illustrated by the following example in conjunction with the drawing wherein the figure represents in schematic form the treatment system whereby sulfuric acid mist and vapor are removed from the effluent from the final absorber of a contact process sulfuric acid plant and $SO_2$ is removed from the thus treated stream and recycled.

EXAMPLE 1

With reference to the drawing, air is introduced into the system through line 10 which passes the air stream into dryer 12 which contains concentrated sulfuric acid as the desiccant material. A portion of the dried air leaving drier 12 is fed via valve 14 into furnace 16 and the remainder of the dried air stream is passed into line 18. Simultaneously, sulfur is passed through line 20 into furnace 16 where it is burned with oxygen from the air therein to form sulfur oxides, principally $SO_2$. The combustion products, which also include $x$ small amounts of $NO_x$ and $CO_2$, and residual nitrogen and oxygen leave the furnace 16 through line 22 and are combined with additional dry air from line 18 via valve 24 to enter catalytic converter 26 which contains a vanadium based catalyst at elevated temperature. Also entering converter 26 through line 28 valves 30 and 24 and line 22 is a gas stream containing oxygen, $SO_2$ and nitrogen, the origin of which is provided infra. The effluent from converter 16 is essentially $SO_3$, oxygen, nitrogen, a small quantity of unconverted $SO_2$, and $NO_x$. This effluent is conducted through line 32 to acid absorber 34 where the $SO_3$ is contacted by aqueous sulfuric acid and is converted to sulfuric acid by reaction with water. Product sulfuric acid is removed from the acid absorber through line 36. The gaseous effluent from acid absorber 34 is composed of oxygen, nitrogen, $NO_x$, $SO_2$, $SO_3$, $CO_2$, water vapor, and sulfuric acid vapor, and has entrained therein sulfuric acid mist particles. The effluent from acid absorber 34 is passed through line 38 at a temperature of 170°F to heat exchanger 40 which is provided with a spray section wherein sulfuric acid (97 wt.-% $H_2SO_4$) at a temperature of 60°F is sprayed into the gas stream and impinges on the internal surfaces of the heat exchanger, thus providing intimate contact of the gas stream during its passage through the heat exchanger. The cooling water through the heat exchanger is adjusted with respect to flow rate and temperature to obtain a liquid and gas phase effluent from the heat exchanger at a temperature of 60°F. The gas phase in its passage through heat exchanger 40 becomes saturated with respect to $H_2SO_4$ at 60°F and loses condensed sulfuric acid and some of its $SO_3$, $NO_x$ and $H_2O$ content to the liquid phase. The effluent gas stream from heat exchanger 40 is passed via line 42 to mist eliminator 44. Entrained in this gas stream are mist particles of sulfuric acid. A portion of the liquid phase from heat exchanger 40 is also passed to mist eliminator 44 through line 42 and remains essentially in equilibrium with the gas phase flowing through the same line. The temperature of the mist eliminator is maintained at 60°F and the gas phase passes through the fiber elements of the mist eliminator and exits through line 46. The mist particles are collected by the fiber elements and are accumulated by gravity flow in the liquid phase in the bottom of the mist eliminator. The liquid sulfuric acid from the mist eliminator is recycled via line 48, pump 50 and line 52 back to heat exchanger 40. Due, in part, to the solution of $SO_3$ in the liquid phase sulfuric acid being cycled between the heat exchanger and the mist eliminator, its concentration with respect to $H_2SO_4$ increases and can exceed optimum values. Also the vapor pressure of $NO_x$ in the gas phase is not reduced to the degree possible by solution in the liquid phase sulfuric acid unless the dissolved content of $NO_x$ therein is kept to a minimum. Accordingly, continuously or periodically some of the recycle sulfuric acid from line 48 is drained off through line 54 and valve 56 and water is introduced through line 58 and valve 60. The effluent gas stream from mist eliminator 44 passing through line 46 is directed through valve 54 into adsorption bed 56 which contains activated zeolitic molecular sieve crystals as the adsorbent. Essentially all of any water and sulfur trioxide and the sulfur dioxide present in the gas stream are adsorbed in bed 56 and the non-adsorbed constituents, chiefly oxygen, nitrogen and trace quantities of sulfur dioxide are conducted out of the bed 56 through line 58 and valve 60 and are vented to the stmosphere. While bed 56 is adsorbing $SO_2$, companion bed 62 is undergoing desorption of water and $SO_2$ previously adsorbed in the same manner as above described with respect to bed 56. In the desorption of bed 62 dry heated air as a purge gas is passed through valve 64, line 66 countercurrently through bed 62 and exits through valve 68 carrying desorbed water and sulfur dioxide through line 70 to line 28. If at any time the water concentration of the effluent from bed 62 in line 28 is undesirably high to enter converter 26, the gas stream can be directed via valve 30 to line 10 and dehydrated in dryer 12 before being introduced into the furnace 16 and/or converter 26 in the same manner as the air stream introduced into the system through line 10. If the water concentration is sufficiently low, the gas steam from line 18 can be fed directly to converter 26.

What is claimed is:

1. Process which comprises providing a gas stream effluent from a contact process sulfuric acid absorber, said gas stream effluent being at a temperature of from 120°F. to 200°F. as a result of passage through said absorber, and comprising $SO_2$, oxygen, $SO_3$, sulfuric acid vapor and sulfuric acid mist, cooling said gas stream effluent to a temperature of from 50°F. to 100°F. and intimately contacting same with an aqueous sulfuric acid solution containing from 93 to 99 weight-% $H_2SO_4$ whereby said gas stream becomes saturated with respect to $H_2SO_4$ vapor at the existing temperature and contains sulfuric acid mist particles, thereafter passing said gas stream to a mist eliminator to remove said mist particles while maintaining the gas stream saturated with respect to sulfuric acid vapor, withdrawing the demisted gas stream from the mist eliminator and further treating said gas stream to remove $SO_2$ therefrom.

2. Process according to claim 1 wherein the cooling of the gas stream effluent from the contact process sulfuric acid absorber is accomplished while in intimate contact with an aqueous sulfuric acid solution containing from 93 to 99 weight per cent $H_2SO_4$.

3. Process according to claim 2 wherein the mist eliminator comprises a porous fiber element on which the mist particles impinge and are removed from the gas stream entering said mist eliminator.

4. Process according to claim 3 wherein a portion of the aqueous sulfuric acid is in contact with the gas stream being cooled to the range of 50° to 100°F is fed to the said mist eliminator in equilibrium with said gas stream being passed to said mist eliminator.

5. Process according to claim 2 wherein the demisted gas stream withdrawn from said mist eliminator is further treated to remove $SO_2$ therefrom by selective adsorption of said $SO_2$ on a crystalline zeolitic molecular sieve adsorbent.

* * * * *